United States Patent [19]

Chi

[11] Patent Number: 4,479,152
[45] Date of Patent: Oct. 23, 1984

[54] ADJUSTABLE EQUALIZER
[75] Inventor: Chao S. Chi, Shrewsbury, Mass.
[73] Assignee: Sperry Corporation, New York, N.Y.
[21] Appl. No.: 370,708
[22] Filed: Apr. 22, 1982
[51] Int. Cl.³ .................. G11B 5/09; G11B 5/45
[52] U.S. Cl. ................................ 360/46; 360/65
[58] Field of Search ......................... 360/46, 45, 65

[56] References Cited
U.S. PATENT DOCUMENTS

| | | | |
|---|---|---|---|
| 3,048,664 | 8/1962 | Drukey | 360/65 |
| 3,436,490 | 5/1969 | Roelofs | 360/65 |
| 4,244,008 | 1/1981 | Holt | 360/65 |
| 4,405,954 | 9/1983 | Gursinger | 360/65 |

Primary Examiner—Vincent P. Canney
Attorney, Agent, or Firm—Howard P. Terry

[57] ABSTRACT

An automatically adjustable equalizer for modifying the spectral contour of digital, analog, and magnetically recorded signals. A temperature sensor-controlled switching circuit automatically adjusts the delay and forward gain parameters of the equalizer so as to optimize the equalization contour, in discrete ranges, over a wide range of temperatures, pressures or other physical processes or conditions.

12 Claims, 9 Drawing Figures

ADJUSTABLE EQUALIZER

BACKGROUND OF THE INVENTION

1. Field of the Invention

This invention relates generally to spectral equalization circuits and more particularly to an equalizer for magnetic recording and signal processing applications in which the spectral contour is automatically adjustable over a wide range to compensate for component and recording track tolerances and to enhance signal resolution.

2. Description of the Prior Art

It is well known that when signals conveying information are transmitted through a channel they undergo amplitude and phase distortion, often called spectral distortion. To the extent that the transmission channel may be characterized as a linear network having a given frequency transfer function, this spectral distortion may be compensated for using well known signal processing circuits called equalizers. Generally the equalizer is used to negate the effects of the channel as characterized by the given frequency transfer function.

As an example of a prior art equalizer, reference may be made to Kameyama et al, "Improvement of Recording Density by Means of Cosine Equalizer", *IEEE Transactions on Magnetics,* Vol. MAG-12 No. 6, Nov. 1976. This prior art equalizer has the disadvantage of not being automatically adjustable in response to an external stimulus, such as temperature or pressure, nor can it readily compensate for manufacturing tolerances or track width related storage density variations.

In the magnetic recording art, for instance, an information bearing signal in the form of a write current is passed through a write head which induces proportionally varying degrees of magnetism in a magnetic medium moving past the head. The magnetic medium retains its magnetization which constitutes a recording. Playback is the process in reverse: the magnetization in the medium induces varying electric currents in a read head and the currents are transformed into a reproduction of the original signal. As is generally true with infomation bearing signals transmitted through a channel, the signals derived from the read head undergo a certain amplitude and phase distortion. This distortion manifests itself in such phenomena as peak shift and amplitude loss which can degrade the data recovery reliability. One cause of this distortion is intersymbol interference or the interraction between adjacent bits of information. Intersymbol interference is becoming increasingly troublesome as bit storage densities are pushed higher and higher.

Related to the problem of providing reliable data recovery at high storage densities is the costly problem of fabricating magnetic recording heads to very close tolerances. For example, a typical magnetic recording system might employ a read head having a gap of $55\mu$ in and operating at a flying height of $20\mu$ in. These dimensions have a direct bearing on the resolution of the system and thus must be maintained to very close tolerances. This is especially true in fixed head systems, for example, which might typically employ 24 heads on each side of a two sided magnetic disc medium. In such a system considerable effort must be expended to assure that all of the heads have practically the same resolution and response characteristics. The problem is compounded when the system must work under environmental extremes, such as at very low and very high temperatures. At high temperatures, for instance, much greater peak shift is exhibited due to temperature induced physical changes in head and medium. As an example, high temperature affects the aerodynamic pressures around the head, causing increased flying height and degraded read back signal resolution.

In prior art practice, when these environmental extremes were encountered the recording system had to be designed on a worst case basis. That is, the system would typically be a compromise between optimum high temperature performance and optimum low temperature performance. For instance, at high temperatures it is desirable to equalize more severely than at low temperatures so as to narrow signal pulses. However, to do so would result in over equalization at room temperatures which causes ripples in the waveform and severe noise increase.

Thus there is a need for a means to overcome the problem of spectral distortion encountered in information systems which operate under extreme environmental conditions or with very precise manufacturing tolerances.

Another problem common to disc media is that data storage density is not uniform across the disc. The outermost track of a given circumference can store data with less crowding than does the innermost track, which has a much shorter circumference. Thus the track radius is another factor which can affect data recovery.

SUMMARY OF THE INVENTION

The present invention comprises a self adjusting equalizer for varying the spectral contour of a signal in response to an external stimulus. The stimulus may be, for example, temperature or pressure, if the source of distortions sought to be overcome is temperature or pressure related. Or the external stimulus may be manually selected, such as by factory calibration, if the problem sought to be overcome is related to manufacturing tolerances, or as a designed-in operational function such as spectral boosting for inner track in a disc file.

The invention further comprises a delay means such as a delay line receptive of the signal, from a read head for example, for providing a delayed signal. The delay means has one or more taps or the like for providing a variety of selectable delay times. An impedance means, such as a resistive divider network, receives the signal and attenuates it by a selectable amount, thereby providing an attenuated signal. The invention further comprises a differential amplifier which is responsive to the delayed signal and to the attenuated signal for providing an equalized signal whose spectral contour is a function of the selected time interval and selected attenuation. The invention further comprises a control means responsive to the external stimulant for adjusting the delay time, attenuation, or both. The spectral contour of the equalized signal is thus adjusted in accordance with the external stimulus.

DESCRIPTION OF THE PREFERRED EMBODIMENTS

Figure 1:
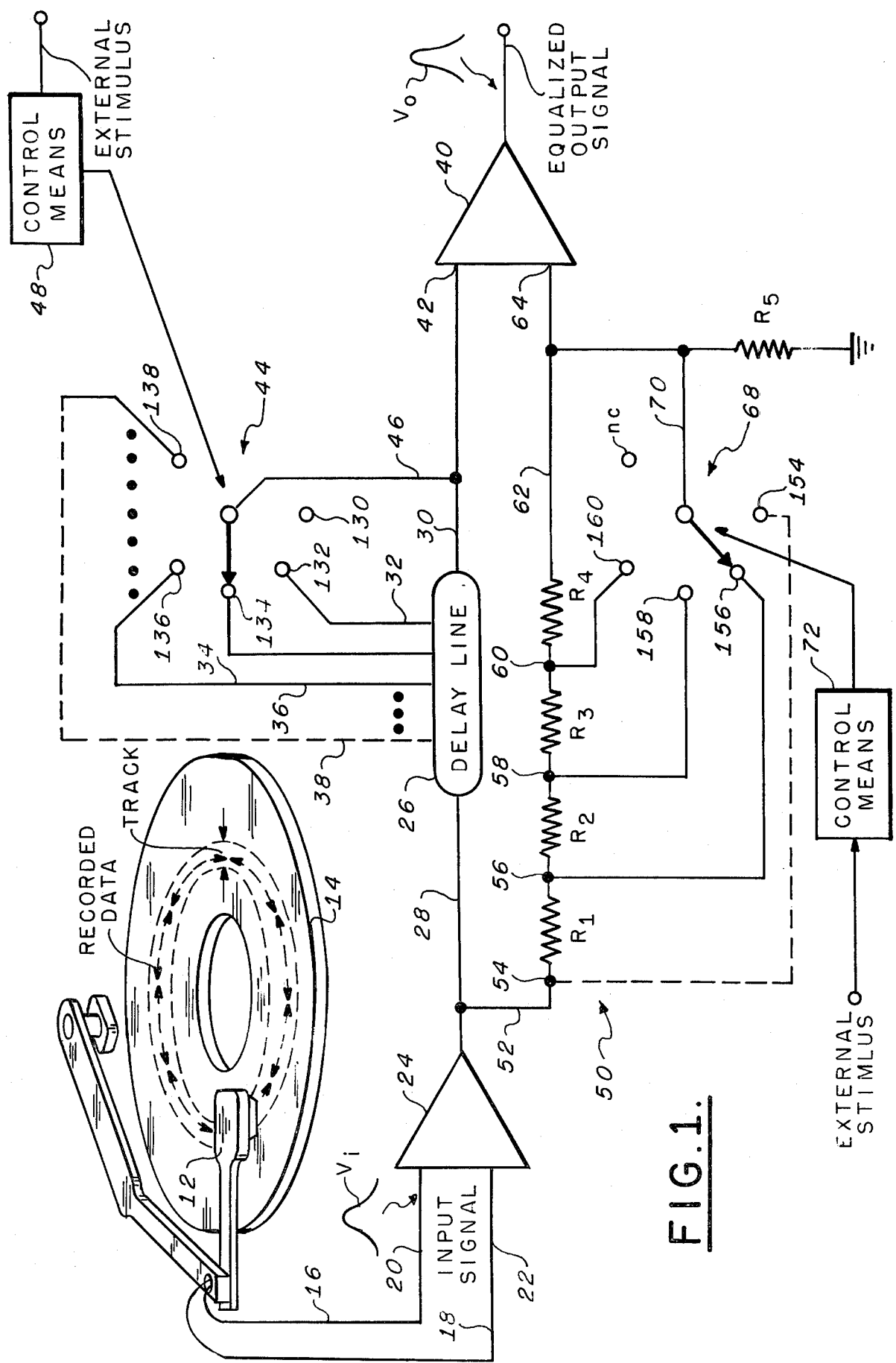
FIG. 1 is a block schematic diagram illustrating the principles of the invention.

While the present invention is useful throughout the signal processing art, it will be explained in the context of a magnetic recording system. Accordingly, in FIG. 1 the read section of a magnetic recording system is illustrated at 10, comprising a read head 12 and magnetic medium 14. Data encoded signals from read head 12 are conveyed through leads 16 and 18 to the input terminals 20 and 22 of an amplifier 24. The magnetic recording system providing signals to amplifier 24 is conventional and operates in the usual fashion. Amplifier 24, as will be discussed in more detail later, provides buffering and impedance matching between the input terminals 20 and 22 and a delay line 26. Delay line 26 may be any of the standard tapped delay lines commercially available. Delay line 26 has an input terminal 28 and output terminal 30 as well as a plurality of taps 32, 34, 36 and 38. Delay line 26 receives a signal from the output of amplifier 24 at its input lead 28 and provides an output, which constitutes a delayed version of the input, on lead 30. The output of delay line 26 on lead 30 is terminated with a relatively high impedance constituting substantially an open circuit or an open-ended termination. This is accomplished by connecting the output lead 30 of delay line 26 to the positive or non-inverting terminal 42 of a differential amplifier 40. The differential amplifier 40 is of the commercially available type having a high input impedance. While delay line 26 has been shown for purposes of illustration as having four taps, 32, 34, 36, and 38, any number of taps may be used to suit the particular application.

The taps of delay line 26 are connected to corresponding terminals 130, 132, 134, 136, and 138 of a signal routing device 44 which functions to selectively short circuit the output lead 30 of delay line 26 to any of the delay line taps. Short circuiting the output lead 30 to any tap effectively reduces the total delay time. In FIG. 1 this signal routing device is illustrated as a single pole multiple throw rotary switch, although equivalent electronic switches may be readily substituted therefor as will be shown in connection with FIG. 2. Signal routing device 44 is under the control of a control means 48 which operates in response to an external stimulus to selectively connect or disconnect the appropriate delay line tap to or from output lead 30. For example, the external stimulus might be a change in the ambient temperature surrounding the recording system 10. In this case control means 48 might comprise a thermocouple or thermostat for controlling an electronic signal routing device. Further details of this application will be given in connection with FIG. 2.

The invention further comprises a tapped impedance device 50 which receives the output of amplifier 24 on lead 52 and provides a plurality of voltage attenuations at taps 54, 56, 58 and 60 through the agency of resistors $R_1$, $R_2$, $R_3$ and $R_4$. The tapped impedance device 50 provides an output on lead 62 which is applied to the negative or inverting terminal 64 of differential amplifier 40. Connected between lead 62 and the system ground is an impedance $R_5$. It will be seen that impedance 50 and impedance $R_5$ comprise an amplitude divider network for providing, on lead 62, and attenuated version of the signal applied at lead 52. It will readily be appreciated that the signal on lead 62 is attenuated by a factor of $R_5/(R_N+R_5)$, where $R_N$ is the net impedance of impedance device 50.

The net impedance of impedance device 50 is adjustable through the agency of a second signal routing device 68, which like signal routing device 44 is illustrated in FIG. 1 as a single pole multiple throw rotary switch. The switch is connected at terminals, 154, 156, 158, and 160 to the respective taps 54, 56, 58 and 60 of impedance device 50. Signal routing device 68 is also connected via lead 70 to the output lead 62 of impedance 50 and thus permits the selection of various net impedances $R_N$ by making or breaking a short circuit signal path around selected impedances $R_1$, $R_2$, $R_3$, and $R_4$. The signal routing device provides this adjustment under the control of a control means 72 which is responsive to an external stimulus. It will be understood that signal routing device 68 may be a simple rotary switch having a shaft driven by an electromechanical device, or by an external control signal, or it may be a dedicated electronic switch under the control of an electronic sensor in the system.

Before considering the invention in a more detailed description of the preferred embodiment, a general analysis of the circuit operation will be presented. The input signal applied at leads 20 and 22 is buffered in amplifier 24 whose output impedance matches the input impedance of delay line 26. Thus the signal propagating into delay line 26 experiences virtually no reflection. However, the output of delay line 26 at lead 30 is terminated in an open circuit by virtue of the extremely high input impedance of differential amplifier 40. This open circuit causes the signal propagating through delay line 26 to experience total reflection at the output, hence this signal amplitude is doubled as compared with that at the input. The output signal on lead 30, delayed by an effective delay time $\tau$, is applied to the positive or noninverting terminal of differential amplifier 40.

Meanwhile the input signal from amplifier 24 is applied via lead 52 to the impedance divider network 50. Also applied to input lead 52 of impedance divider 50 is the reflected signal component from lead 42, now delayed by $2\tau$, appearing at lead 28 of delay line 26. The impedance divider network 50 reduces the applied signal by a factor K, which is a ratio $R_5/(R_N+R_5)$, hereinafter referred to as the feed forward gain, attenuation factor, or attenuation amount. The attenuated signal from divider 50 is applied to the negative or inverting terminal of differential amplifier 40 and is thus subtracted from the signal applied at lead 42.

If the input signal is expressed as $f_i(t)$, then the output of the equalizer, $f_o(t)$, is expressed as $$f_o(t) = f_i(t) - K/2\{f_i(t+\tau) + f_i(t-\tau)\} \tag{1}$$

Alternatively expressing the transfer function of the equalizer in the frequency domain, the frequency response becomes, $$F(\omega) = 1 - K \cos \omega\tau. \tag{2}$$

Figures 2A, 3:
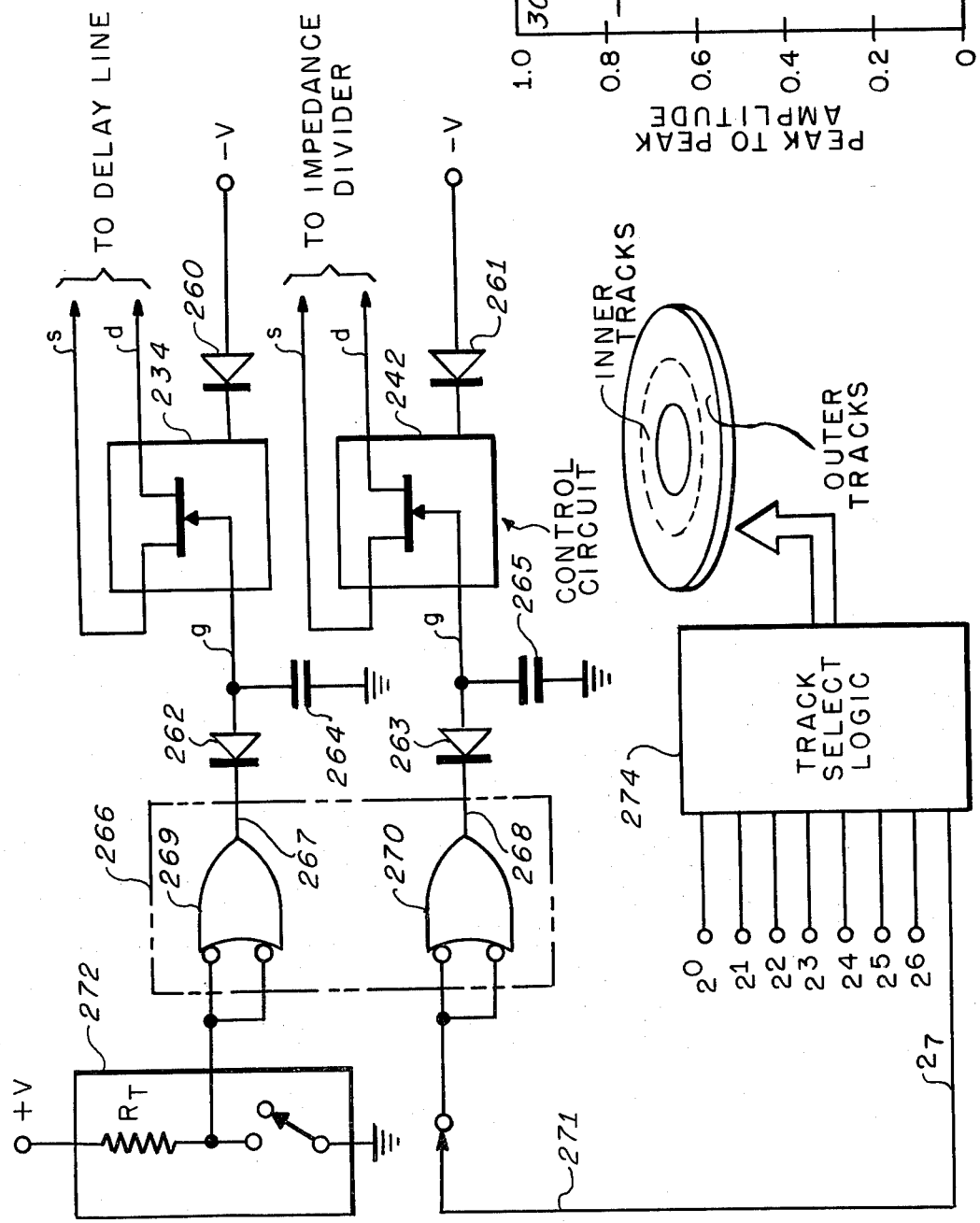
FIG. 3 is a graph depicting the relationship between signal pulse width and amplitude for various delay times and feed forward gain parameters, useful in describing the operation of the invention.

The equalizer provides pulse slimming as can be seen in FIG. 1 by comparing an isolated pulse input signal $V_i$ with the corresponding output signal $V_o$. With reference to FIG. 3, the pulse slimming effect can be defined in terms of an amplitude normalized Lorentzian isolated pulse 300 whose pulse width may be measured in terms of parameter T, the half width of the isolated pulse at the 50 % amplitude level. FIG. 3 is a family of curves which shows the resulting half width and zero-to-peak amplitude values measurable at the output of the equalizer for various delay times $\tau$ and feed forward gain parameters K. The unequalized input signal amplitude is normalized to unity and its half width is normalized to the delay line time, as will be seen from FIG. 3. Thus FIG. 3 demonstrates how the output pulse $V_o$ is slimmed to a greater or lesser degree depending on the parameters $\tau$ and K. The broken line in FIG. 3 is a critical condition line indicating the boundary where the output pulse waveform becomes oscillatory due to overcompensation.

Figure 2:
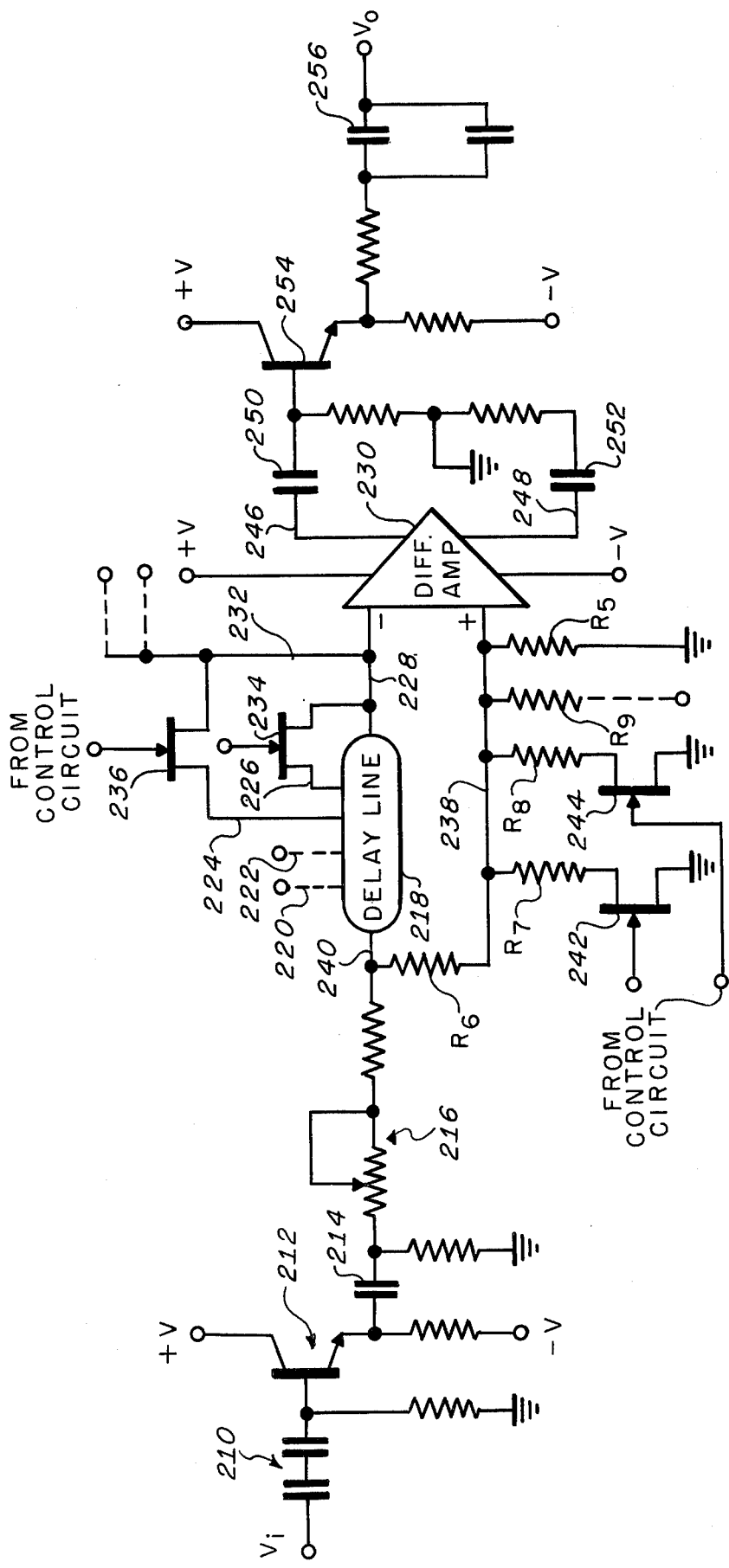
FIGS. 2 and 2a are a more detailed schematic diagram of the invention.

FIGS. 2 and 2a illustrate the presently preferred embodiment of the invention in greater detail. This embodiment has particular utility when an adjustable equalizer must be made responsive to external stimuli such as temperature or pressure variations and track locations.

One important application is in a digital magnetic recording system for use in an on board air data flight computer. Such a system might employ, for example, a disc memory system which must operate over a wide range of temperatures. Such temperature variations can cause drastic variations in the read back signal. Furthermore, in disc storage systems the innermost data tracks are more densely recorded than the outermost tracks. This is a well known consequence of the fact that the innermost track has a much reduced circumference compared with the outer tracks. The inventor herein has discovered, unexpectedly in view of the prior art, that these problems are satisfactorily solved utilizing the present invention in which either one or both of the K and $\tau$ parameters are varied in accordance with signals derived from a thermocouple device, or in accordance with recording track radius.

Referring to FIG. 2, the input signal is applied at terminal $V_i$ and a.c. coupled through capacitors 210 to a conventional transistor in emitter follower configuration 212. The ouput of emitter follower 212 is coupled through capacitor 214 to an adjustable impedance network 216 which serves to match the source impedance of delay line 218. Delay line 218 is a conventional, commercially available tapped delay line having taps 220, 222, 224 and 226. The output of delay line 218 is connected to the inverting terminal 228 of a conventional, commercially available differential amplifier 230. The number of taps on the delay line 218 may vary the particular application, depending on whether two different spectral contours or a multiplicity of spectral contours are desired. In the former case, any unused taps may be left disconnected. It will be appreciated by those skilled in the art that the number of taps to be utilized and the particular delays $\tau$ corresponding to those taps are selected with a view towards optimizing system performance over specified operating ranges. FIG. 3 illustrates this system performance in terms of parameters $\tau$ and K as previously discussed.

In order to select various delay times $\tau$ FET switches are used. FIG. 2 illustrates FET switch 234 connected between tap 226 and a bus 232 which is connected to the output lead 228 of the delay line. Similarly, FET switch 236 is connected between tap 224 and bus 232. The FET switches are controlled by a control circuit which is responsive to the relevant external stimulus. This control circuit is shown in more detail in FIG. 2a and will be discussed more fully below.

The invention also comprises an impedance divider network consisting of an impedance $R_5$ inserted between the system ground and the positive or noninverting input lead 238 of differential amplifier 230. The noninverting lead 238 is also connected through an impedance $R_6$ to the input lead 240 of delay line 218. Depending upon the number of discrete spectral contours desired, one or more shunt impedance $R_7$, $R_8$, $R_n$ are connected between lead 238 and the system ground through FET switches such as switches 242 and 244. The switches are in turn controlled by the control circuit shown in FIG. 2a. When the switches are activated, such as switch 242 for example, the corresponding impedance, such as $R_7$, is connected in parallel with impedance, $R_5$. This changes the effective impedance between lead 238 and ground, thereby affecting the feed forward gain parameter K. Feed forward gain parameter K is related to the impedance values according to the following formula: $K = R_6/(R_6 + R_p)$, where $R_p$ is the net parallel impedance between lead 238 and ground including $R_5$ and any additional impedances switched into parallel state by the FET switches.

The output of differential amplifier 230 is carried on leads 246 and 248 through coupling capacitors 250 and 252 to a second transistor emitter follower amplifier 254 which provides impedance buffering and converts the output from a balanced output to a single-ended ouput. This single-ended output is coupled through capacitors 256 to the output terminal $V_o$.

Referring to FIG. 2a the control circuit is illustrated in more detail. FIG. 2a includes two FET switches denoted generally by blocks labeled 234 and 242, thus these switches correspond to the like-numbered FET switches of FIG. 2. It will be understood that the circuit of FIG. 2a may be duplicated to provide additional FET switches, corresponding to the switches labeled 236 and 244 of FIG. 2 for example, if more discrete spectral contour ranges are desired. FET switches 234 and 242 are supplied with a bias voltage through diodes 260 and 261 in the conventional fashion. Each FET switch includes the conventional source and drain leads given reference characters s and d on FIG. 2a, and it will be understood that these leads would be connected between the differential amplifier and the delay line or impedance divider as shown in FIG. 2. The FET switches also include a gate lead g which controls the conduction or non-conduction of currents between source and drain leads in the usual fashion. Each gate terminal g recieved a control signal via a signal diode such as diodes 262 and 263 which serve to protect the switches from power surges pr transients. A capacitor, such as capacitors 264 or 265 is connected between the gate terminal g and ground which serve to shunt out high frequency noise.

Because the conventional, commercially available FET device may require dc supply voltages on the order of 15 volts, a TTL to high voltage (15 v.) converter 266 is used. As illustrated in FIG. 2a the converter 266 may take the form of a well known NOR gate having output leads 267 and 268 for connection to signal diodes 262 and 263 respectively, and having input terminals which can be tied together, such as terminals 269 and 270. With input terminals tied together the NOR gate acts as a simple inverter and also converts from TTL voltage levels to the higher voltage levels required by the FET switches. With continued reference to FIG. 2a the invention further includes a sensor or device for controlling each FET switch. Although a variety of sensors and devices may be used in different combinations, FIG. 2a illustrates a typical configuration. FET switch 234 is controlled by sensor 272 which may be a thermostat, a thermocouple, or the like, designed to sense the ambient temperatures of a magnetic recording system. Sensor 272 receives a bias voltage +V and delivers this voltage across a resistance $R_t$ to input leads 269 when the temperature is such that the sensor 272 is in its open circuit or logical high state. The sensor 272 is also connected to the system ground so as to ground the input leads 269 when the sensor is in its short circuit or logical low state. It will be appreciated that the temperature at which sensor 272 changes from open to short circuit state will vary with the device, and that a wide variety of devices are commercially available.

FET switch 242 is controlled or activated by the conventional track select logic 274. By sending a logical high signal to input leads 270, the FET switch 242 will be turned off, resulting in increased equalization boost and increased pulse slimming. By sending a logical low signal to input leads 270 the FET switch 242 will be turned on, with decreased equalization and slimming as a result. The logical high or low signals may be derived from the conventional track select logic 274 which is normally used in a magnetic recording system to control which track is written or read. If a simple inner trackouter track discrimination is desired, leads 270 may be coupled via lead 271 to the track select terminal corresponding to track position $2^7$, i.e. 128. Thus all track numbers below 128 would yield a logical low command signal corresponding to the outer tracks. All track numbers equal to or above 128 would yield a logical high signal corresponding to the inner tracks.

To give an example in operation, assume that at room temperature sensor 272 is in the closed circuit (low state) and sensor 274 is at the outer track zone (low state) so that the input leads 269 and 270 receive a logical low signal. Inverting through the converter circuit causes a logical high signal to be present at the gates of both FET switches 234 and 242. Thus the FET switches are biased towards conduction causing delay line tap 226 to be tied to bus 232 (reduced $\tau$) and impedance $R_7$ to be connected in parallel with impedance $R_5$ (reduced K). For purposes of this example it will be assumed that delay line 218 has only one tap, namely 226, and further assumed that only one shunt impedance, such as impedance $R_7$, is utilized. Thus for purposes of this example the circuit will automatically select on the basis of temperature and track radius from one of two gain factors K and one of two delay factors $\tau$.

If sensor 272 switches to its open circuit or nonconductive state in response to increasing temperature, of if lead 271 is high corresponding to an inner track condition a logical high signal will be applied to the corresponding input terminal 269 or 270 of converter circuit 266. Inverted by the converter circuit, a logical low signal would appear at the corresponding gate terminal of the FET switch. The FET switch would thus be biased towards its nonconductive state thereby disconnecting the corresponding delay line tap or shunt impedance. The spectral contour is thus boosted due to the increase of delay time $\tau$ or feed forward gain K.

While the invention has been explained in terms of a control circuit responsive to temperature changes and track radius, it will be appreciated that the control circuit may be responsive to any of a number of stimuli, and may also be self programmed, self tested and stored as will prove to be a useful tool in compensating for head to head manufacturing tolerances.

Figure 4:
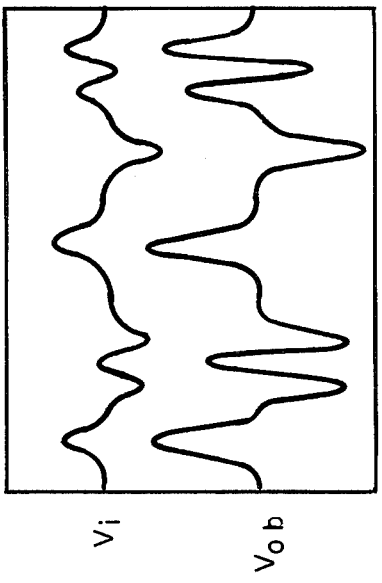
FIG. 4, consisting of a through d, is a series of write and read waveforms useful in demonstrating the operation of the invention.
Figure 4:
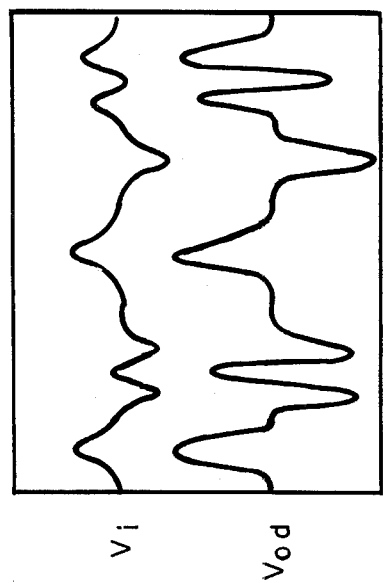
Figure 4:
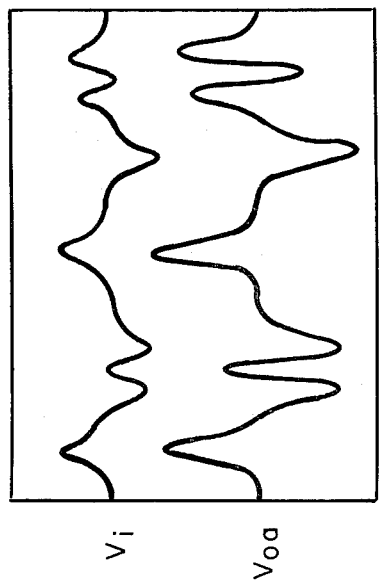
Figure 4:
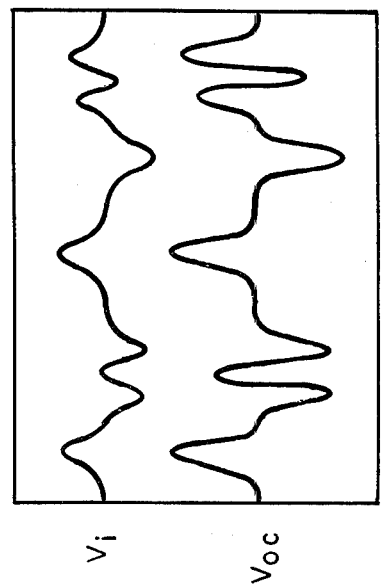
Figure 5:
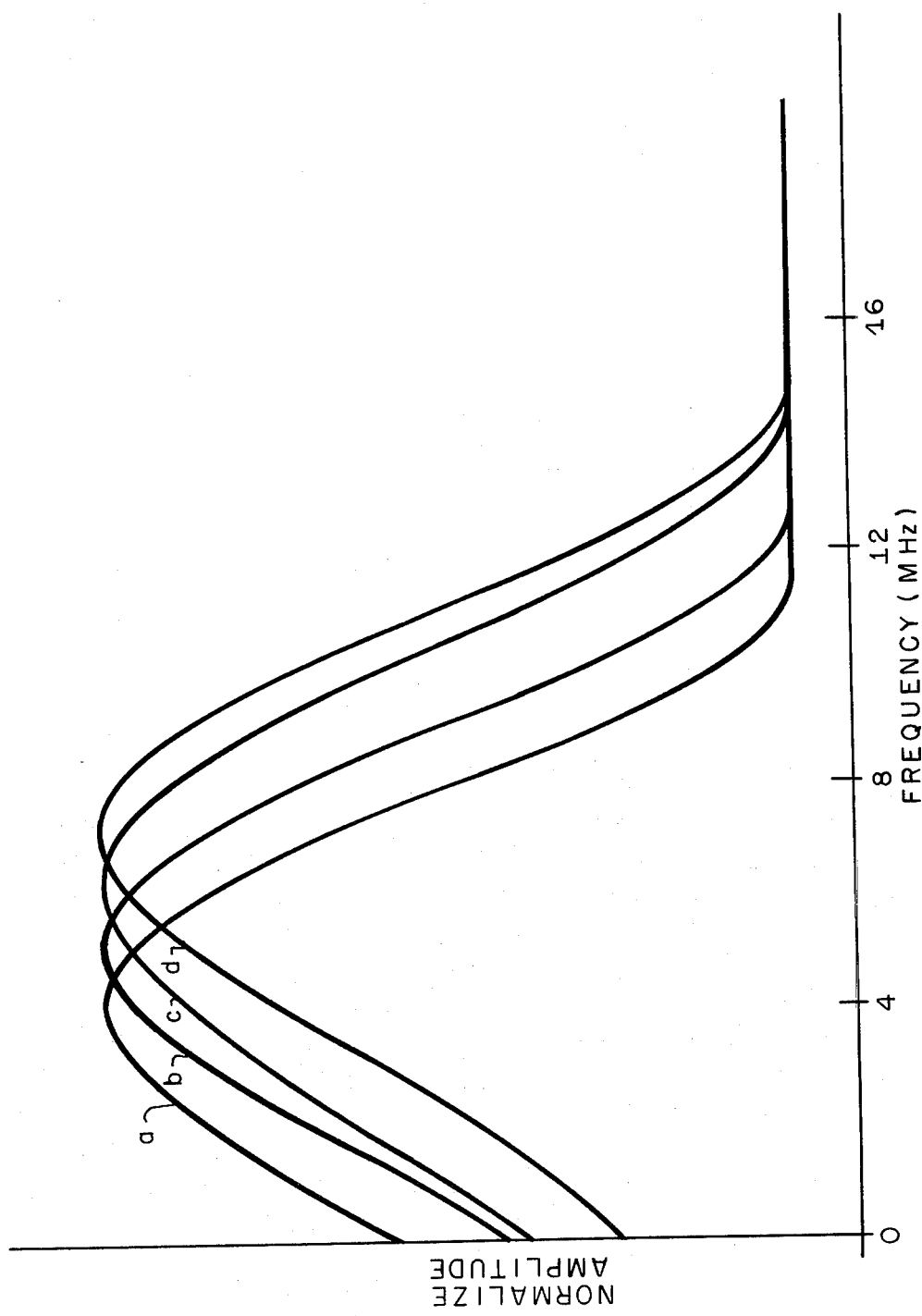
FIG. 5 is a series of spectral contour graphs demonstrating the operation of the invention.

The adjustable equalizer, by utilizing a multiplicity of delay line taps and feed forward gain parameters, can effectively segment the systems equalizer requirements into discrete equalization ranges, where near optimum results can be achieved in each range. FIGS. 4 and 5, and Table I illustrate the performance of the present invention where the system equalization needs are broken into four discrete ranges. The circuit used to achieve these results might be that of FIGS. 2 and 2a in which delay line tap 226 is connected to FET switch 234 and all other taps are not connected, and wherein impedance $R_7$ is connected through FET switch 242 to ground, with all other switchable shunt impedance omitted.

FET switch 234 may be controlled by a thermostatically controlled switch 272 and FET switch 242 may be controlled by a data track radius sensor, for example. Table I gives the four possible equalization states corresponding to FIGS. 4a, 4b, 4c, and 4d. In Table I it will be assumed that FET switch 234 is on when the ambient temperature is below a certain preselected temperature. FET switch 242 will be assumed on when the data track radius is greater than a preselected radius.

TABLE I

| FET 234 | on | on | off | off |
|---|---|---|---|---|
| FET 242 | on | off | on | off |
| Equalization boost | minimum | lower intermediate | higher intermediate | maximum |

FIG. 4 illustrates 4 groups of waveform pairs, the uppermost of each pair representing the unequalized input waveform $V_i$, exemplary of a typical read waveform of a magnetic recording system. The lowermost waveforms of each pair represent the equalized output waveforms of the invention for all the possible on-off combinations of FET switches 234 and 242. It will be noted that the input waveform $V_i$ is the same for all four groups of waveforms. Thus the spectral contour adjustments induced by the invention can be seen from the output waveforms $V_{oa}$, $V_{ob}$, $V_{oc}$, and $V_{od}$.

FIG. 4a illustrates the output waveform $V_{oa}$ which results when both FET switches are on, corresponding to a forward gain factor K of 0.45 and a delay time constant $\tau$ of 36 ns. As compared with the other output waveform, waveform $V_{oa}$ represents the minimum pulse slimming condition. In particular, compare the amplitudes of the second positive going pulses 4 shown in FIGS. 4a–4d, and also compare the slope at the base line of the waveform at 5 just prior to the third positive going pulse.

FIG. 4b illustrates the equalized output waveform $V_{ob}$ for the case where FET switch 234 is on an FET switch 242 is off, corresponding to a forward gain K of 0.45 and a delay $\tau$ of 60 ns. FIG. 4c shows the output waveform $V_{oc}$ when FET switch 242 is on and FET 234 is off. This corresponds to a forward gain factor K of 0.61, and a delay $\tau$ of 36 ns. Comparing the amplitude of pulse 4 and the waveform slope at 5 it will be seen that waveforms $V_{ob}$ and $V_{oc}$ represent successively greater increments of equalization.

FIG. 4d illustrates the equalized waveform $V_{od}$ when both FET switches are off, corresponding to the maximum equalization for the four possible combinations presented, corresponding to a forward gain K of 0.61 and a delay $\tau$ of 60 ns. It will of course be appreciated that FIG. 4 illustrates but one typical application of the invention, where the spectral contour imparted by the equalizer is broken down into four discrete ranges. This is not to be viewed as a limitation, since greater or fewer discrete ranges, and other feed forward gain factors K and delay times $\tau$ may be freely chosen. Likewise, while the presently preferred embodiment employs FET switches, other equivalent switching devices may be substituted therefore. Furthermore, depending on the system constraints it may be necessary to adjust both the forward gain K and delay $\tau$ factors, or possibly only one of them. It will also be recognized that the forward gain factor K may be altered in a continuous fashion using variable impedance devices, such as FET's or other transistors operating in the linear active mode rather than the switching mode.

FIG. 5 illustrates an exemplary frequency domain response or spectral contour of the equalizer. The spectral contour curves are designated as a, b, c, and d and show respectively increasing amounts of equaliztion or pulse slimming.

While the invention has been described in its preferred embodiments, it is to be understood that the words that have been used are words of description rather than of limitation and that changes within the purview of the appended claims may be made without departing from the true scope and spirit of the invention in its broader aspects.

I claim:

1. An equalizer for adjusting the spectral contour of a signal in response to an external stimulus comprising,
   delay means for delaying said signal by a time interval, thereby providing a delayed signal,
   impedance means for attenuating said signal by an attenuation amount, thereby providing an attenuated signal,
   differential means responsive to said delayed signal and said attenuated signal for providing an equalized signal whose spectral contour is a function of said time interval and said attenuation amount, and
   control means responsive to said stimulus for adjusting at least one of said time interval and said attenuation amount, thereby adjusting said spectral contour of said equalized signal in accordance with said stimulus.

2. The equalizer of claim 1 wherein said delay means includes means for selectively providing a plurality of time delay intervals.

3. The equalizer of claim 1 wherein said impedance means includes means for selectively providing a plurality of attenuation amounts.

4. The equalizer of claim 2 wherein said control means includes means for selecting among said time delay intervals.

5. The equalizer of claim 3 wherein said control means includes means for selecting among said attenuation amounts.

6. The equalizer of claim 1 wherein said delay means includes means for selectively providing a plurality of time delay intervals and said impedance means includes means for selectively providing a plurality of attenuation amounts.

7. The equalizer of claim 6 further comprising delay control means responsive to said stimulus for selecting among said time delay intervals, and attenuation control means responsive to said stimulus for selecting among said attenuation amounts.

8. The equalizer of claim 1 wherein said control means includes temperature sensing means.

9. The equalizer of claim 1 wherein said control means comprises temperature sensing means for providing a binary signal indicating whether said temperature is above or below a predetermined temperature.

10. The equalizer of claim 9 wherein said control means comprises field effect switching means responsive to temperature sensing means.

11. An equalizer for adjusting the spectral contour of a signal derived from a disc recording system of the type utilizing a plurality of selectable concentric tracks of various radii including an inner track and an outer track according to claim 1, wherein said control means includes means for discriminating between said inner track and said outer track.

12. The equalizer of claim 11 wherein said means for discriminating comprises track radius sensing means for providing a binary signal representing the radius of each of said tracks and means for testing said binary signal to determine whether said radius is above or below a predetermined radius.

* * * * *